United States Patent

[11] 3,610,552

[72] Inventors Kazuyuki Shirakura
4-15-15 Kamiuna, Setagaya-ku, Tokyo;
Koichi Iwase, c/o Tamagawa-jutaku Ro 3-205, 3-1-130 Somechi, Chofu-shi, Tokyo, both of Japan

[21] Appl. No. 872,183
[22] Filed Oct. 29, 1969
[45] Patented Oct. 5, 1971
[32] Priority Oct. 30, 1968, Oct. 30, 1968
[33] Japan
[31] 79127/68 and 79128/68

[54] TAPE CARTRIDGE
16 Claims, 16 Drawing Figs.

[52] U.S. Cl. .......... 242/199, 352/72
[51] Int. Cl. .......... G03b 1/04, G11b 15/32, G11b 23/04
[50] Field of Search .......... 242/192, 197–200, 71.2; 352/72–78

[56] References Cited

UNITED STATES PATENTS

| | | | |
|---|---|---|---|
| 3,043,531 | 7/1962 | Sinkewitsch | 242/198 X |
| 3,417,938 | 12/1968 | Markakis et al. | 242/200 |
| 3,520,495 | 7/1970 | Sotani | 242/192 |
| 3,526,371 | 9/1970 | Blackie et al. | 242/192 |

*Primary Examiner*—Leonard D. Christian
*Attorneys*—Lewis H. Eslinger, Alvin Sinderbrand and Curtis, Morris & Safford

ABSTRACT: A tape cartridge having a supply and takeup reel in which the reels can be located so as to vary the distance between them. An adapter fits around the periphery of the tape cartridge which permits the cartridge to be used in both large and small enclosures. The reels are adjustable to be accommodated on spindles which are relatively proximate or distal in the small and large enclosures respectively.

INVENTORS
KAZUYUKI SHIRAKURA
KOICHI IWASE
BY
Lewis H. Eslinger
ATTORNEY

INVENTORS
KAZUYUKI SHIRAKURA
KOICHI IWASE
BY
Lewis H. Eslinger
ATTORNEY

INVENTORS
KAZUYUKI SHIRAKURA
KOICHI IWASE

BY Lewis H. Eslinger

ATTORNEY

TAPE CARTRIDGE

BACKGROUND OF THE INVENTION

Cassettes and tape cartridges are well known and have been standardized as to size in the industry. The reason for making the cassettes a standard size is to enable the cassette of any manufacturer to be used with a power supply for replaying or recording the tape of any other manufacturer. Unfortunately, this leads to the drawback that the recording and replay devices are generally large because the size of the cassette limits their size.

SUMMARY OF THE INVENTION

The present invention is concerned with a tape cassette having a supply and a takeup reel therein. The reels are housed between upper and lower housing members which can be completely enclosed by sidewalls.

The hub upon which the tape is wound is axially movable within an aperture which can be in the form of a figure "8." Each figure "8" is canted toward the other such that the bisecting line of each figure "8" intersects the other. Each hub is movable within the aperture such that the hubs will fit over spindles which are set apart from each other at variable distances.

An adapter which can extend around three sides of the cassette is used to enable the cassette to fit within large cassette receiving openings.

It is therefore, an object of this invention to provide a cassette which will fit within both large and small enclosures.

It is a further object of this invention to provide a cassette having reels which can be adjusted to vary the distance between them.

It is still a further object of this invention to provide an adapter on a cassette which enable it to be used with both large and small enclosures.

Further objects and advantages of the present invention will become apparent as the following description proceeds, and the features of novelty which characterize the invention will be pointed out with particularity in the claims.

DESCRIPTION OF THE PREFERRED EMBODIMENT

Figure 2:
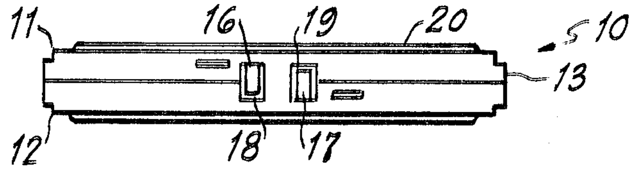
FIG. 2 is a rear end view of a cartridge.
Figures 1, 3:
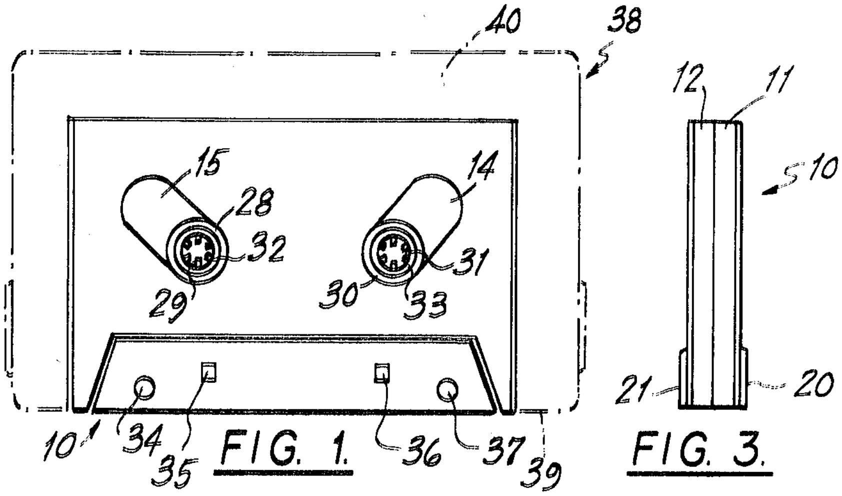
FIG. 1 is a plan view showing a tape cartridge and an adapter in phantom lines.
FIG. 3 is an end view of a tape cartridge.
Figure 4:
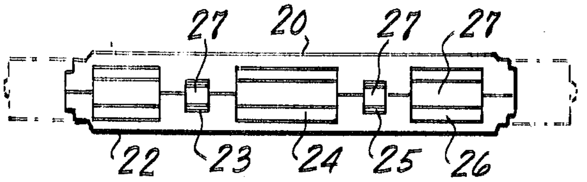
FIG. 4 is a front end view of a tape cartridge and an adapter.
Figure 5:
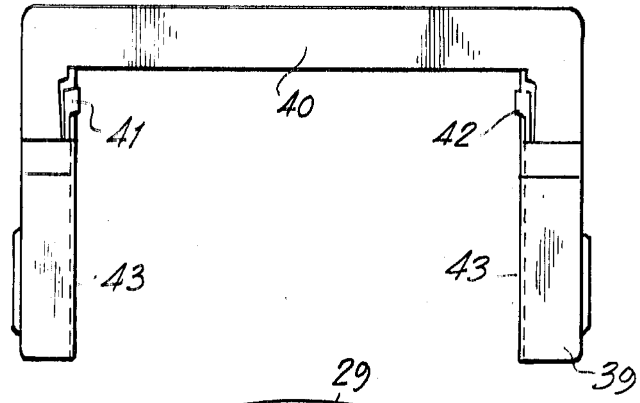
FIG. 5 is a plan view of an adapter.
Figure 6:
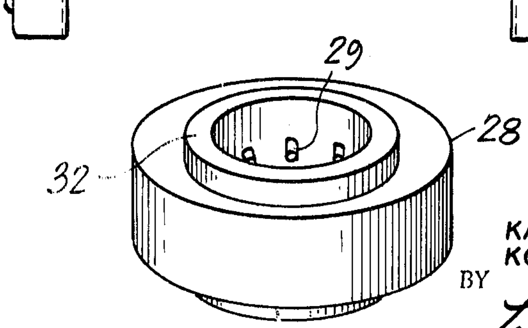
FIG. 6 is a perspective view of a tape reel.

Referring to Fig. 1, there is shown a tape cassette or cartridge 10 which can be molded as a one-piece housing or can be formed of separate upper and lower mating sections 11 and 12 respectively. A sidewall 13 can extend around the periphery of the cassette 10 to enclose the cassette. Alternatively, vertical posts (not shown) can be used to join the upper and lower mating sections 11 and 12 without the sidewall 13.

A pair of apertures 14 and 15 are located on the upper and lower sections 11 and 12. The apertures are disposed at an angle of approximately 45° from the horizontal, although any convenient angle will suffice, such that the forward portions of the apertures are relatively close and the apertures become increasingly further apart as the rear end of the apertures is approached. The apertures can be in the form of a figure "8" or any other desirable configuration.

A pair of removable tabs 16 and 17 serve to conveniently and properly orient the housing 10 of the cassette within a power supply and affects the actuation thereof in a manner to be explained in detail hereinbelow.

Tab 16 is fixed to upper section 11 and tab 17 is fixed to lower section 12. Each tab mates with a corresponding slot 18 and 19 respectively in the other section and each tab is easily broken off from the housing 10.

The front portion of the cassette 10 has a raised portion 20 and 21 on each moiety of the cassette to accommodate the recording tape and the drive therefor.

A series of apertures 22 to 26 is provided on the front of the cassette 10, in the raised portions 11 and 12. A recording tape 27 is disposed adjacent the apertures 22 to 26 so that it can be driven by rollers and to enable it to be in contact with a recording head. The tape 27 is wound on a supply reel 28 having sprockets 29 thereon. A drive spindle (not shown) in the power unit (not shown) drives the reel by moving the sprockets. A takeup reel 30 having sprockets 31 thereon receives the other end of the tape 27. Each reel 28 and 30 respectively can have a boss 32 and 33 respectively thereon which extends into each respective aperture 14 and 15. The bosses thus constrain each reel to movement within the confines of its respective aperture.

Various openings 34, 35, 36 and 37 are provided on the cassette 10 to receive mechanism such as a capstan (not shown) and to receive locating pins (not shown) which properly orient the cassette 10 on the power unit.

An adapter 38 which can be in the form of a U-shaped member extends around the periphery of the cassette 10. The legs 39 are connected by a bight 40. The overall length of the adapter is the same as the standard size opening in power units designed to receive cassettes. When the adapter is removed, the small cassette can be used in a smaller enclosure and, therefore, a smaller power unit. The adapter can be fit onto the cassette 10 by using a friction fit or any other known attaching means. For example, a pair of detents 41 and 42 which can be relatively thin pieces of plastic which are resiliently urged inward with respect to each leg 39. Each leg can be hollowed out as shown at 43 if desired thereby permitting a close fit between the cassette and the adapter in which there is no movement between these members.

Figure 7:
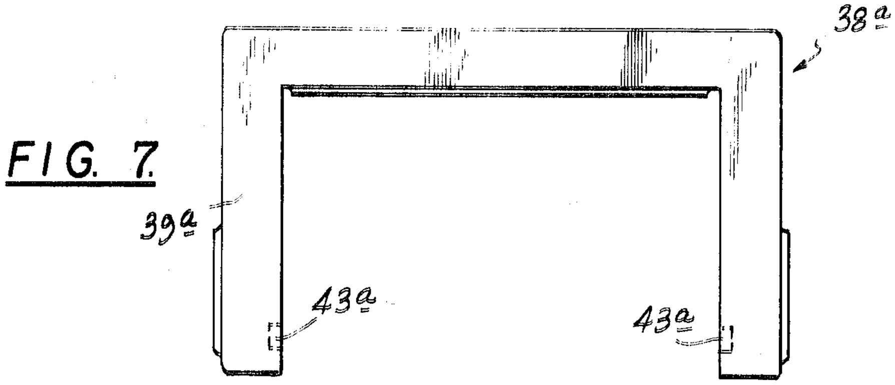
FIG. 7 is a second embodiment of an adapter.

In Fig. 7 there is shown another embodiment of an adapter **38*a* which is essentially the same as the adapter depicted in Fig. 1 except that it has openings 43*a* therein which receive an outstanding boss (not shown) on opposite sides of each cassette. Since the adapter is made of a relatively flexible material, such as plastic, the legs 39*a* can be spread in a direction away from each other and can be snapped or cammed over the outstanding bosses. The latter configuration serves to positively lock the adapter on the cassette 10**.

Figure 8:
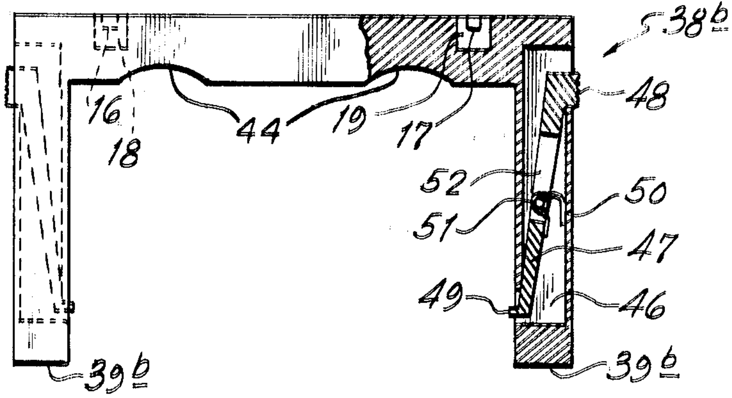
FIG. 8 is a third embodiment of an adapter.

Another embodiment of an adapter is depicted in Fig. 8 which again depicts the basic U-shape configuration. The adapter can have cutout portions 44 which receive complimentary mate projection 45 on a cassette. Formed in each leg **39*b* of the adapter are hollow portions 46 which are open on the upper and lower side of each leg 39*b*. Pivotally mounted within each hollow leg portion 46 is a lock lever 47 which has a serrated upper section 48 and a lower hook portion 49. A coiled spring 50 has one end thereof fixed to the leg 39*b* and its other end is coiled around a pin 51 fixed to an open midportion 52 of the lock lever. The coil spring urges the hook portion 49 inwardly so as to firmly grasp an opening 49*a* formed in the side of the cassette 1–*b*. To separate the cassette 10 from the adapter 38*b*, the user merely presses the serrated portions 48 inwardly. This motion biases the hooks 49** out of engagement with the cassette and the cassette can be separated from the adapter.

Figure 9A:
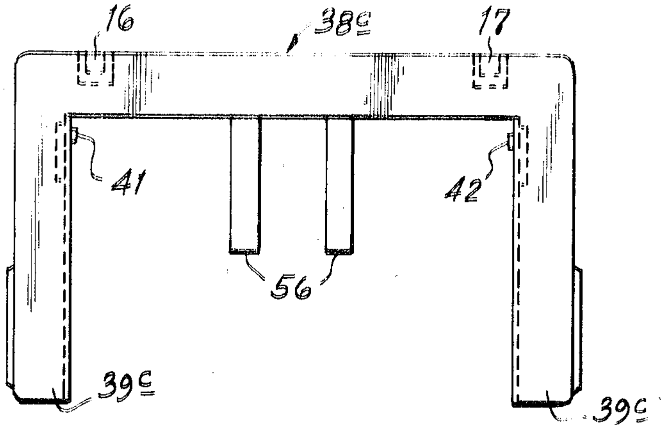
FIG. 9*a* is a plan view of a fourth embodiment of an adapter.
Figure 9:
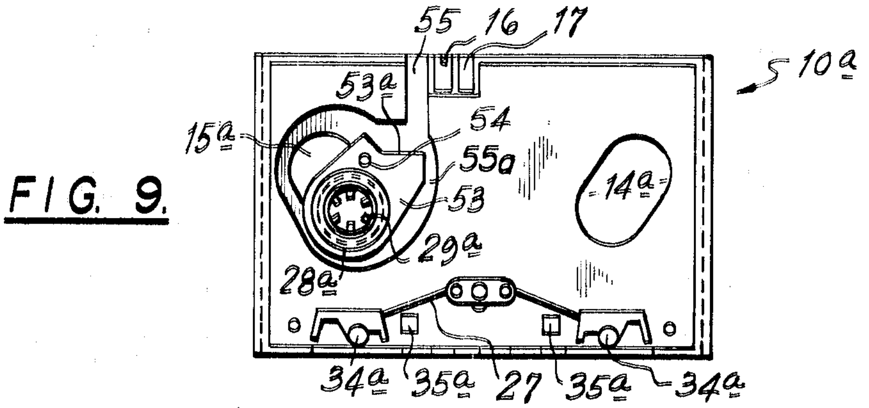
FIG. 9 is a second embodiment of a tape cartridge.
Figure 10:
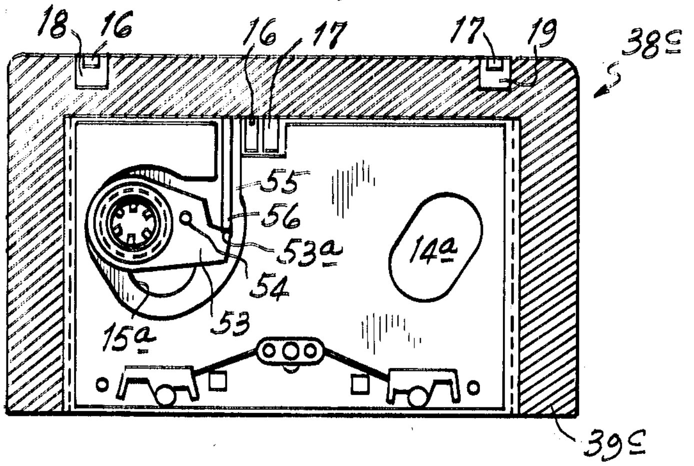
FIG. 10 is the second embodiment of a tape cartridge; with an adapter.

Turning now to Fig. 9, there is shown another cassette 10a having basically the same configuration as the cassette shown in Fig. 1. In the embodiment shown in Fig. 9, however, an arm 53 is rotatably and loosely secured to the reel 28a within the confines of the aperture 15a. The identical structure is provided within the aperture 14a and since the right side of the cassette 10a is the mirror image of the left side, the drawing does not show this detail. A pin 54 is secured to the arm 53 such that the pin follows the contour of the aperture 15a when the arm 53 is moved. An elongated opening 55 is formed on either side of the cassette 10a (only the left side is shown herein) which meets with a cutout portion 56 in which the arm 53 rotates. The arm is formed into a leg 53a having a flat side thereon at one end. The leg 53a is in axial alignment with the elongated opening 55. The adapter 38c in Fig. 9a is similar to the previously described adapters except that it has two depending arms 56. When the adapter 38c is slid onto the cassette 10a, each arm 56 enters into its respective elongated slot 55. The arm abuts the flat side of the arm 53a and pivots the arm 53 about the pin 54 which acts as a pivot point. Since the arm 53 is attached to the reel 28a, the reel is moved upwardly in the aperture 15a to a fixed position, depending upon the length of the arm 56. Thus, when the arm 56 is fully inserted into the elongated opening 55 as shown in Fig. 10, the reel 28a will be moved and positively fixed in the position shown in Fig. 10. Thus, by using the depending arms 56 on the adapter 38c, the user need not move the supply and takeup reels, since they will be moved automatically into perfect alignment with the drive and takeup spindles in the power unit. The magnetic tape 27 is threaded through the forward portion of the cassette 10a as in the previous embodiment.

Figure 11:
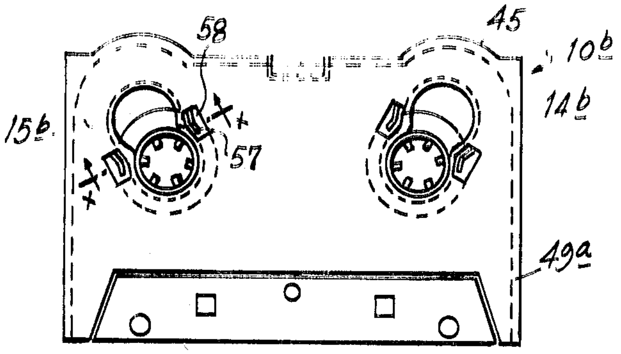
FIG. 11 is a third embodiment of a tape cartridge.
Figure 12:
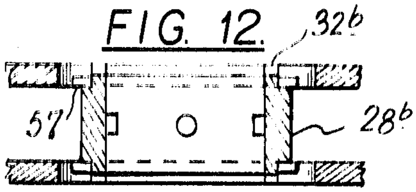
FIG. 12 is a view taken on the line X—X.
Figure 12A:
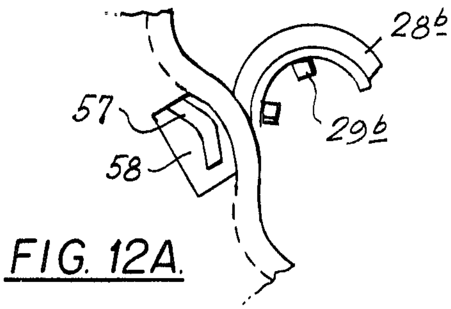
FIG. 12*a* is a view showing details of the third embodiment.
Figure 12B:
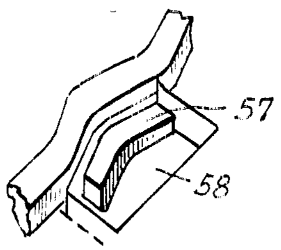
FIG. 12*b* is a view showing further details of the third embodiment.

In Fig. 11, there is depicted another embodiment of a cassette 10b. The cassette is formed basically as in the previous embodiments, however, it includes projections 45 which mate with corresponding cutout portions 44 on the adapter 38b. The apertures 14b and 15b are formed in the shape of the figure "8" such that each reel can nest in either the upper or lower portion of the "8." Approximately at the midpoint of the figure "8" there is a depending resilient tang 57 which is housed in an opening 58. The tang bears against the boss 32b and precludes movement of the reel between the upper and lower portions of the figure "8." If the user forces the reel shown in Fig. 11 from the lower portion of the "8" against the resilient tang 57, the tang will yield and the reel can then move into the upper portion of the "8." The tang 57 will then return to its rest position and preclude further lateral movement of the reel without the application of an outside force. In this way, the reels 28 and 30 can be adapted to fit onto spindles in a power unit which are at variable distances apart.

Figure 13:
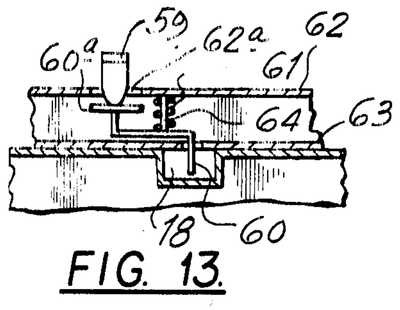
FIG. 13 is a plan view showing parts in section of another embodiment of the invention.

In Fig. 13 there is depicted a means to prevent the accidental erasure of matter which was previously put onto magnetic tape. As was previously disclosed each cassette 10 and each adapter 38 can have thereon two removable tabs 16 and 17. The purpose of these tabs will now be fully explained. The power unit into which the cassettes are inserted are equipped with a switch 59 which leads to the main actuating circuit of the power unit. When the switch 59 is in the undepressed position indicated in Fig. 13, the power circuit is interrupted and the drive spindle in the power supply cannot operate to drive the takeup reel 30 and thus cannot record or play back the magnetic tape. An actuating member 60 which can be Z-shaped is attached to a coil spring 61. The actuating member 60 is mounted between parallel walls 62, 63 on the adapter 38. A longitudinal rod 64 can be used which extends through an opening in the actuating member to serve as a guide member. The actuating member 60 has a head 60a thereon which can contact and actuate the switch 59. The tab 16 normally overlies the opening 18 in the housing of the cassette 10. When the tab 16 is removed, however, by breaking it away, as depicted in FIG. 13, then one leg of the Z-shaped actuator can extend into the opening 18. In this condition the head 60a of the actuator 60 exerts no pressure on the switch button 59. Assuming that the tab 16 has not been removed and overlies the opening 18, then the lower leg of the actuator 60 can not extend into the opening 18. The head 60a of the actuator will now be on the same level as the wall 62 and the switch button 59 will not extend into the opening 62a. In this instance, the actuator 60 will depress the switch button 59 thereby completing the primary circuit and permitting the flow of current to the power supply.

The effect of this is that once a tape has been used it cannot be reinserted into the recorder in such manner that the subject matter can be erased. The operation is as follows: the user inserts a cassette, with or without the adapter 38, into the power unit. If a tab 16 is on the cassette, the actuator 60 will depress the switch 59 and the power supply will be operative. The user records on the magnetic tape and when he has finished, he removes the cassette 10 from the power supply. The tab 16 is then removed from the cassette 10 either by hand or it can be removed automatically when the cassette is removed from the power supply. If the user inadvertently places the cassette 10 in the power supply and tries to record over the previously recorded portion, the power supply will not operate because the leg of the actuator 60 will be submerged in the opening 18 and the switch 59 will not be depressed. Since there are two tabs 16 and 17, one tab will serve to control one side of the tape and the other tab will serve to control the opposite side. Thus, when both tabs have been removed, it will be impossible to actuate the power supply to record over the used tape.

We claim:

1. In a tape cartridge adapted for use with a tape recorder comprising, a. a supply reel and a takeup reel which are spaced apart, for receiving and holding a magnetic tape,
b. a housing holding said reels and having means thereon for selectively varying the distance between said spaced supply and takeup reels.

2. In a tape cartridge adapted for use with a tape recorder as defined in claim 1 further comprising a boss on each reel which serves to maintain said reels in the means for selectively varying the distance between said spaced reels.

3. In a tape cartridge adapted for use with a tape recorder as defined in claim 1 further comprising adapter means to conform at least one dimension of said housing with a tape recorder having a tape cartridge receiving opening therein thereby enabling said cartridge to fit within said opening.

4. In a tape cartridge adapted for use with a tape recorder as defined in claim 1 in which said means for selectively varying the distance between said reels comprises said housing having apertures therein.

5. In a tape cartridge as defined in claim 4 in which said apertures are elongated and their longitudinal axes intersect.

6. In a tape cartridge adapted for use with a tape recorder comprising, a. a supply reel and a takeup reel which are spaced apart for receiving and holding a magnetic tape,
b. a housing enclosing said reels and having means therein for maintaining them in a predetermined spaced relationship,
c. at least one removable member on said housing for selectively allowing or preventing the insertion of an actuating member on said tape recorder which actuates the power supply for said tape recorder thereby preventing the accidental erasure of a recorded magnetic tape.

7. In a tape cartridge adapted for use with a tape recorder as defined in claim 7 in which two spaced removable members are located on said housing which members can be removed from said housing upon retracting said tape cartridge from said tape recorder.

8. An adapter for use with a tape cartridge and a power supply comprising, a. a member having at least two legs of a predetermined thickness adapted to be removably attached to a tape cartridge, whereby said legs adapt said tape cartridge to be used with said power units having various sized cartridge-receiving openings.

9. An adapter for use with a tape cartridge and a power unit as defined in claim 8 in which said adapter further comprises a bight connecting said legs so as to form a U-shaped member which conforms to three sides of said tape cartridge.

10. An adapter for use with a tape cartridge and a power unit as defined in claim 8 in which said adapter further comprises a resilient detent on each leg to firmly maintain said legs on said tape cartridge.

11. An adapter for use with a tape cartridge and a power unit as defined in claim 8 in which said adapter further comprises a spring biased lever fixed to each leg in which one end of the lever has a portion thereon adapted to engage in an opening on said cartridge.

12. In a tape cartridge as defined in claim 1 in which said means for selectively varying the distance between the reels comprises, a. said housing having a pair of spaced elongated apertures thereon the form of the figure "8."

13. In a tape cartridge as defined in claim 12 further comprising means located between the oval portions of said figure "8" for preventing a reel from moving from one oval to another.

14. In a tape cartridge as defined in claim 13 in which said means comprises a resilient tang depending from an opening in the housing in which pressure exerted by said reel on said tang will bend the tang and thereby permit said reel to move from one oval of said figure "8" to another.

15. In a tape cartridge as defined in claim 1 in which said supply and takeup reels each have an arm rotatably mounted thereon in which said arm moves the respective reel to a fixed position as a result of being actuated by an external member.

16. In a tape cartridge as defined in claim 15 further comprising an adapter having a pair of depending arms thereon in which said depending arms actuate said arms in said reels when said adapter is placed on said tape cartridge.

UNITED STATES PATENT OFFICE
CERTIFICATE OF CORRECTION

Patent No. 3,610,552 Dated October 5, 1971

Inventor(s) Kazuyuki Shirakura Koichi Iwase

It is certified that error appears in the above-identified patent and that said Letters Patent are hereby corrected as shown below:

In the heading, insert:

Assignee: Sony Corporation, Tokyo, Japan

Signed and sealed this 16th day of April 1974.

(SEAL)
Attest:

EDWARD M.FLETCHER,JR.
Attesting Officer

C. MARSHALL DANN
Commissioner of Patents